United States Patent [19]
Brown et al.

[11] Patent Number: 5,882,526
[45] Date of Patent: Mar. 16, 1999

[54] METHODS FOR TREATING REGULATED WATERS WITH LOW LEVELS OF OXIDIZING HALOGENS AND HYDROGEN PEROXIDES

[75] Inventors: Geoffrey A. Brown, Lithonia; E. LeRoy Lines, Jr., Atlanta, both of Ga.

[73] Assignee: Great Lakes Chemical Corporation, West Lafayette, Ind.

[21] Appl. No.: 874,105

[22] Filed: Jun. 12, 1997

[51] Int. Cl.$^6$ .................................................. C02F 1/76
[52] U.S. Cl. ......................... 210/753; 210/754; 210/756; 210/759
[58] Field of Search ................................ 210/764, 759, 210/753, 754, 755, 756

[56] References Cited

U.S. PATENT DOCUMENTS 3,483,120  12/1969  Hatch .......................................... 210/50
5,478,482  12/1995  Jones et al. .............................. 210/753

FOREIGN PATENT DOCUMENTS 657897  12/1994  Australia .

OTHER PUBLICATIONS

Worley, S.D. and Williams, D.E. "Halamine Water Disinfectant." CRC Critical Review in Environmental Control, vol. 18, Issue 2, 1988, pp. 133–175.

White, G.C. "Dechlorination," in *The Handbook of Chlorination*, 2nd ed., by Van Nostrand Reinhold Company, Inc., 1986, pp. 755–788.

Rauhut, M.M. "Chemiluminescence," in *Kirk–Othmer Encyclopedia of Chemical Technology*, by John Wiley & Sons (New York). vol. 5, 1984, pp. 416–450.

*Primary Examiner*—Jay H. Woo
*Assistant Examiner*—Betsey J. Morrison
*Attorney, Agent, or Firm*—Woodard, Emhart, Naughton, Moriarty & McNett

[57] ABSTRACT

Methods for treating regulated waters with low levels of oxidizing halogens and hydrogen peroxide are disclosed, wherein the halogen-containing compound is provided with an erosion control agent such as glycoluril, and the hydrogen peroxide is provided with a hydrogen peroxide stabilizer such as a polyquaternary ammonium compound. Additional stabilizers to chelate metals and increase the half life of peroxide in aqueous solutions may also be added.

17 Claims, No Drawings

METHODS FOR TREATING REGULATED WATERS WITH LOW LEVELS OF OXIDIZING HALOGENS AND HYDROGEN PEROXIDES

The present invention relates generally to methods of treating regulated waters, and more particularly to methods of treating water with both halogenated and non-halogenated oxidizing agents.

BACKGROUND OF THE INVENTION

The clarity of recreational waters is an important measure of overall water quality. Water can become cloudy as bacteria (dead and alive) and swimmer wastes accumulate, overwhelming the system's filtering capacity. Oxidizers such as chlorine, bromine, hydrogen peroxide and potassium peroxymonopersulfate are routinely used to achieve and maintain clear water. However, there are drawbacks to using oxidizers to fulfill this function. For example, chlorine and bromine levels must be maintained at levels of 1–3 ppm (as $Cl_2$) and periodic superchlorination may be required to assure microbiological control and adequate water quality. Hydrogen peroxide and potassium peroxymonopersulfate must be used in much higher concentrations because they are weaker oxidizers than chlorine and bromine.

In spite of the drawbacks identified above, chlorine is still the most widely used water sanitizer because of its effectiveness and relatively low cost. In recreational waters, chlorine provides clean, clear water as long as its levels are appropriately maintained. However, as chlorine has come under sustained environmental scrutiny, the need for efficacious, low or non-chlorine alternatives has arisen. Moreover, recreational customers often complain of skin and eye irritation as well as discolored swimming wear after swimming in halogenated water.

As a result, the use of non-halogenated sanitizers and oxidizers has increased throughout the water treatment industry. For example, polyhexamethylene biguanide (PHMB) and hydrogen peroxide have gained increasing acceptance in the pool and spa industry for sanitation and oxidation, respectively. Consumers have indicated that PHMB-treated water is less irritating than chlorinated waters and will not bleach swim wear or pool surfaces.

However, pools treated with PHMB can develop problems with recalcitrant biofilms such as pink slime, mustard algae and white water mold. When problems such as these are encountered, treatment options are limited since PHMB is incompatible with traditional oxidizers such as chlorine, bromine and potassium peroxymonopersulfate. Hence, it is not uncommon for PHMB users to spend considerable amounts of time and money to remove and kill resistant microbial growths. By contrast, when similar problems arise in pools treated with halogen sanitizers, they can usually be remedied quickly and inexpensively.

Methods for combining polyquats with hydrogen peroxide and for their use as water treatment clarifiers and sanitizers have also been described. As such, polyquats have proven to be very effective stabilizers and performance enhancers for peroxide water treatment systems. Adding products such as non-polymerized surface active agents (e.g., alkyldimethyl-benzylammonium chloride and didecyldimethyl-ammonium chloride) may boost the performance of the system, but may not be readily miscible with the polyquats. In such cases, hydrogen peroxide could be used as the formulating agent to blend the immiscible compounds.

In spite of the above known combinations, commercially viable methods of utilizing combinations of halogen and non-halogen sanitizers have not been developed. The present invention addresses that need.

SUMMARY OF THE INVENTION

Briefly describing one aspect of the present invention, there is provided a method of treating water comprising adding to the water a composition comprising chlorine and glycoluril, followed by the addition of a hydrogen peroxide/polyquat blend. EDTA is also optionally added, and periodic shock treatments with chlorine may also be used.

One object of this invention is to provide an effective method of treating water with halogenated and non-halogenated oxidizers. The inventive system has demonstratable advantages over systems utilizing either halogen or non-halogen oxidizing systems alone, as well as advantages over the simple combination of chlorine with $H_2O_2$.

Further objects and advantages of the present invention will be apparent from the following description.

DESCRIPTION OF THE PREFERRED EMBODIMENT

For the purposes of promoting an understanding of the principles of the invention, reference will now be made to preferred embodiments and specific language will be used to describe the same. It will nevertheless be understood that no limitation of the scope of the invention is thereby intended, such alterations and further modifications in the described device, and such further applications of the principles of the invention as illustrated therein being contemplated as would normally occur to one skilled in the art to which the invention relates.

The present invention uses low levels of chlorine and/or bromine in combination with hydrogen peroxide in order to maintain excellent water quality. The invention is preferably practiced as a two-step method. First, a solid stick of halogen-containing oxidizer is provided to the water, preferably after first being combined with an erosion control agent such as glycoluril. The hydrogen peroxide is added in the second step, preferably after first being combined with a polyquaternary ammonium compound. EDTA or another chelating agent is also preferably used, most preferably as the third step of the new water treatment system. In some embodiments, a fourth step comprising periodic shock treatments is also performed.

As to the chlorine or bromine or other halogen oxidizing agent, oxidizing chlorine may be supplied from any source providing free and/or combined chlorine. For example, tri- or dichloroisocyanurate, dichlorodimethyl- hydantoin, calcium, lithium or sodium hypochlorite may be used.

The chlorine may be added via a device capable of the in situ activation of chloride ions. Similarly, bromine and iodine could be supplied by any chemical carrier (such as hydantoins) or produced by any chemical process (e.g., bromide activation with free chlorine) or device capable of generating oxidizing bromine or iodine in situ. The halogen-containing oxidizing agent is preferably dispensed in a controlled fashion by means of a feeder or erosion control device, although chemical control of erosion or the manual addition directly to the pool or other body of water is used in alternative embodiments. Ideally, compressed TCCA or BCDMH is placed directly in the pool's skimmer.

Most preferably, the halogen oxidizer is added using 0.1 pound to five pound compressed sticks, and particularly using sticks weighing 0.5 pounds to one pound. Halogen levels of 0.5 ppm to about 400 ppm may be used in certain preferred embodiments.

Although the invention preferably utilizes any method which slowly dispenses chlorine in a controlled fashion, the use of N-halamines constitutes the most preferred embodiment since the halamine is generally more stable in the presence of hydrogen peroxide. Accordingly, one preferred embodiment uses compressed trichloroisocyanurate (TCCA) blended with an erosion control compound such as glycoluril. One stick will be added for every five to ten thousand gallons of water. Each stick preferably contains 80–91% TCCA and 1–20% of an erosion control agent such as but not limited to glycoluril. Most preferably 95% TCCA and 5% glycoluril is used.

Bromochlorodimethylhydantoin (BCDMH) could substitute for TCCA as could other forms of chlorine or bromine. Additionally, compressed BCDMH and TCCA could also contain any form of boron (e.g., sodium tetraborate or boric acid), clarifiers, or other additives to enhance performance, stability or appearance.

The second step of the present invention comprises the addition of $H_2O_2$, preferably as a liquid combined with a polyquaternary ammonium compound. The hydrogen peroxide may be added via a metering device, manually or produced on site with a peroxide generator. In some preferred embodiments the hydrogen peroxide is added to the water via liquid hydrogen peroxide, although solid peroxide releasing compounds or peroxide generators may also be used.

Ideally the peroxide is stabilized with a polyquaternary ammonium compound such as but not limited to poly (hexamethylammonium)chloride (Q6/6) or poly [oxyethylene (dimethylimino)ethylene-(dimethylimino) ethylene]dichloride (PDED.) Additionally, chelating agents such as ethylenediamine-tetraacetate (EDTA) or phosophonate compounds could be mixed with the peroxide or added separately as ancillary boosters.

In one preferred embodiment the $H_2O_2$ is provided to the water by adding one half gallon per week of a 0.5–50% solution for every 10,000 gallons of water (27–23% would be the ideal). As indicated above, the peroxide preferably contains 0.01–30% of a polyquaternary ammonium compound. Ideal polyquat concentrations range between 0.2–10%.

Another preferred embodiment uses regular applications of chelating agents such as but not limited to EDTA or phosphonates to remove metals which might degrade hydrogen peroxide. EDTA should be used in concentrations ranging from 0.001–100 ppm. The preferred concentration range is 1–10 ppm. Another preferred embodiment uses a specialized sand matrix that has silver permanently attached to its granules. The silver provides in situ biocidal activity to retard microbial fouling in the filter.

Another preferred embodiment uses a boron containing compound such as sodium perborate or sodium tetraborate to establish a boron level between 1 and 100 ppm, most preferably between 30 and 75 ppm. The boron containing compound(s) would be added at the beginning of the pool season, using subsequent doses as needed to maintain the desired concentration.

Another preferred embodiment uses periodic (weekly, bi-weekly or monthly) shock treatments (halogen or peroxygen) consisting of one or more of the following: chlorine, potassium peroxymonopersulfate, sodium bromide, sodium perborate, sodium percarbonate, aluminum sulfate, sodium tetraborate and sodium persulfate. Shock treatment will help to destroy organic compounds that cause oxidizer demand.

As is known in the art, the shock treatment provides 5–20 ppm active halogen when halogen shock treatments are used. To provide that amount, the actual shock treatment may use 1–100 ppm active halogen. When non-halogen shock treatments are used the active oxygen is provided at an equivalent peroxide level of about 1–100 ppm or more, most preferably between about 10 and 30 ppm.

Another preferred embodiment uses dry or liquid peroxyacids (such as peracetic acid) as maintenance or shock treatments. The peroxyacids would provide an additional peroxygen boost for the treatment system. Peroxyacid concentrations may range between 0.1 and 200 ppm, but the preferred range is 5–30 ppm.

Another preferred embodiment uses monomeric, dimeric or oligomeric surface active agents such as but not limited to alkyldimethylbenzyl ammonium chloride, didecyldimethyl-ammonium chloride, dodecylguanidine hydrochloride to enhance the system's performance. These non-polymeric surfactants could be blended with hydrogen peroxide and polyquats and would preferably deliver concentrations ranging from 0.1–75 ppm in the treated water. Ideal concentrations are 1–4 ppm.

EXAMPLE 1

A 23,000 gallon consumer pool was treated with the following: (1) one-pound compressed sticks of 95% TCCA, with 5% glycoluril as an control agent; and (b) one gallon additions of a product containing 28.5% $H_2O_2$ blended with 1.5% PDED and 0.5% Q6/6. Throughout a 37 day period the pool remained exceptionally clear. This was unexpected because one skilled in the art would have assumed that the residual chlorine and peroxide molecules would have neutralized each other upon contact. Therefore, the water could have been expected to turn cloudy without the presence of a strong oxidizer and low peroxide levels.

It was also surprising to note that hydrogen peroxide levels were apparently unaffected by the presence of the TCCA sticks since the peroxide was not rapidly destroyed (Table 1). The levels of total chlorine usually remained at 1 ppm or below.

TABLE 1

Hydrogen Peroxide Levels During a 14 Day Period

| Day | Peroxide PPM |
| --- | --- |
| 1 | 20 |
| 2 | 10 |
| 3 | 10 |
| 4 | 7 |
| 5 | 5 |
| 6 | 2 |
| 7 | 0 |
| 8[1] | 15 |
| 9 | 10 |

TABLE 1-continued

Hydrogen Peroxide Levels During a 14 Day Period

| Day | Peroxide PPM |
| --- | --- |
| 10 | 5 |
| 11 | 3 |
| 12 | 2 |
| 13 | 1 |
| 14 | 0 |

[1]Peroxide added.

EXAMPLE 2

A 20,000 gallon pool is treated with the following: 5 oz. chlorine stick consisting of 95% trichloroisocyanurate and 5% glycoluril every two weeks, 2 gallons of a product containing 28.5% $H_2O_2$ blended with 1.5% PDED and 0.5% Q6/6 added weekly, 1 quart of solution containing EDTA monthly along with a monthly shock consisting of 5 lb. of lithium hypochlorite. Twenty-eight pools are currently using a preferred embodiment of the invention as described above. This embodiment conveys the essential benefits of the disclosed invention while providing tenable enhancements to current halogen and non-halogen technologies.

EXAMPLE 3

A 20,000 gallon pool is treated with the following: 5 oz. chlorine stick consisting of 95% trichloroisocyanurate and 5% glycoluril every two weeks, 1 gallon of a product containing 28.5% $H_2O_2$ blended with 1.5% PDED and 0.5% Q6/6 added weekly, 0.5 quarts of solution containing EDTA every two weeks along with a monthly shock consisting of sodium dichloroisocyanurate, sodium dipersulfate, aluminum sulfate and sodium tetraborate every two weeks. Twenty-six pools are currently using a preferred embodiment of the invention as described above. This embodiment conveys the essential benefits of the disclosed invention while providing tenable enhancements to current halogen and non-halogen technologies.

EXAMPLE 4

Seven pools treated with PHMB were immediately converted to a program utilizing slowly eroding chlorine sticks and hydrogen peroxide blended with polyquats. No undesirable effects (such as those that would be expected by one skilled in the art) were observed. This was surprising since chlorinating a pool containing PHMB results in a rapid deterioration of water quality (clouding, production of displeasing colors and curdling of N-halogenated PHMB. Clearly, the present invention not only provides a superior means of maintaining excellent sanitation and water quality, but can be used to gently convert a PHMB pool to a chlorine pool.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for treating water, comprising the steps of:

(a) providing to the water a first composition comprising a halogen-containing oxidizer and an erosion control agent;

(b) providing to the water a second composition comprising hydrogen peroxide and a hydrogen peroxide stabilizer.

2. The method of claim 1 wherein the halogen-containing oxidizer is a chlorine-containing oxidizer.

3. The method of claim 1 wherein the halogen-containing oxidizer is a bromine-containing oxidizer.

4. The method of claim 1 wherein the halogen-containing oxidizer is a member selected from the group consisting of tri- or dichloroisocyanurates, calcium hypochlorite, and lithium or sodium hypochlorite.

5. The method of claim 1 wherein the halogen-containing oxidizer is provided via a halogen generator.

6. The method of claim 1 wherein the erosion control agent is a glycoluril.

7. The method of claim 1 wherein the hydrogen peroxide stabilizer is a polyquaternary ammonium compound.

8. The method of claim 1, and further including the step of adding to the water a chelating agent.

9. The method of claim 8 wherein said chelating agent is EDTA.

10. The method of claim 1, and further including the step of periodically shock-treating the water with a shock treatment agent.

11. The method of claim 10 wherein said shock treatment agent is a member selected from the group consisting of chlorine, potassium peroxymonopersulfate, sodium bromide, sodium perborate, sodium percarbonate, sodium tetraborate and sodium persulfate.

12. The method of claim 1 wherein the halogen-containing oxidizer is slowly dispensed chlorine.

13. The method of claim 1 wherein the halogen-containing oxidizer is dispensed via a feeder, skimmer or floater.

14. The method of claim 1 wherein the halogen-containing agent is provided from a liquid halogen source.

15. The method of claim 7 wherein the polyquaternary ammonium compound is blended with the peroxide.

16. The method of claim 7 wherein the polyquaternary ammonium compound is added separately from the peroxide.

17. The method of claim 1 wherein the hydrogen peroxide is added via liquid hydrogen peroxide, solid peroxide releasing compounds or a peroxide generator.

* * * * *

UNITED STATES PATENT AND TRADEMARK OFFICE
CERTIFICATE OF CORRECTION

PATENT NO. : 5,882,526
DATED : March 16, 1999
INVENTOR(S) : Brown, et. al.

It is certified that error appears in the above-indentified patent and that said Letters Patent is hereby corrected as shown below:

In col. 4, line 40, please insert —erosion— before the word "control".

Signed and Sealed this

Sixteenth Day of November, 1999

Attest:

Attesting Officer

Q. TODD DICKINSON

Acting Commissioner of Patents and Trademarks